(12) United States Patent
Momiyama et al.

(10) Patent No.: US 7,147,236 B2
(45) Date of Patent: Dec. 12, 2006

(54) SUSPENSION

(75) Inventors: Fujio Momiyama, Yachiyo (JP);
Tetsuya Yamasumi, Yachiyo (JP);
Naohiro Yuhara, Funabashi (JP); Jun Tajima, Funabashi (JP); Takashi Sasaki, Tokyo (JP)

(73) Assignees: Horikiri, Inc., Yachiyo (JP); Hino Motors, Ltd., Tokyo (JP)

( * ) Notice: Subject to any disclaimer, the term of this patent is extended or adjusted under 35 U.S.C. 154(b) by 252 days.

(21) Appl. No.: 10/690,522

(22) Filed: Oct. 23, 2003

(65) Prior Publication Data

US 2004/0195901 A1    Oct. 7, 2004

(30) Foreign Application Priority Data

Oct. 28, 2002  (JP) .............................. 2002-312598

(51) Int. Cl.
*B60G 11/46* (2006.01)
(52) U.S. Cl. .................... 280/124.17; 280/124.163; 267/40
(58) Field of Classification Search ......... 280/124.136, 280/124.107, 124.106, 124.153, 124.17, 280/124.128; 267/36.1, 40, 47
See application file for complete search history.

(56) References Cited

U.S. PATENT DOCUMENTS

| | | | | |
|---|---|---|---|---|
| 2,085,738 A | * | 7/1937 | Coleman | 280/124.107 |
| 3,434,707 A | * | 3/1969 | Raidel | 267/31 |
| 4,518,171 A | * | 5/1985 | Hedenberg | 280/6.159 |
| 4,759,567 A | * | 7/1988 | Allen | 280/124.162 |
| 6,533,299 B1 | * | 3/2003 | Platner | 280/124.1 |
| 6,607,206 B1 | * | 8/2003 | Petit | 280/124.163 |
| 6,962,360 B1 | * | 11/2005 | Reast | 280/124.165 |

FOREIGN PATENT DOCUMENTS

| | | | |
|---|---|---|---|
| JP | 06143955 A | * | 5/1994 |
| JP | 2003-34113 | | 2/2003 |

\* cited by examiner

*Primary Examiner*—Paul N. Dickson
*Assistant Examiner*—Barry Gooden, Jr.
(74) *Attorney, Agent, or Firm*—Oblon, Spivak, McClelland, Maier & Neustadt, P.C.

(57) ABSTRACT

In order to provide a suspension which is inexpensive and light in weight and which can attain substantially improved vehicle-riding comfort without lowering drivability, an axle is hanged from a chassis side (side rails) by resilient supports (leaf and air springs) with different spring characteristics arranged forwards and rearwards of the axle. The axle 1 is allowed to make rolling motion due to difference in spring characteristic between the forward and rearward resilient supports.

5 Claims, 4 Drawing Sheets

ROUGHNESS OF ROAD SURFACE

SUSPENSION

CROSS-REFRENCE TO RELATED APPLICATION

This application is related to and claims priority, under 35 U.S.C. § 119, from Japanese Patent Application No. 2002-312598, filed in the Japanese Patent Office on Oct. 28, 2002, the entire contents of which is hereby incorporated by reference herein.

BACKGROUND OF THE INVENTION

1. Field of the Invention

The present invention relates to a suspension.

2. Discussion of Background

There are various suspensions each for hanging an axle from a chassis frame of a vehicle. Among them, leaf suspensions with layered leaf springs have been widely used for vehicles such as trucks since they are simple in structure, less expensive, of high strength and highly durable.

It is, however, undeniable that the conventional leaf suspensions are inferior in vehicle-riding comfort to the existing air suspensions. Air leaf suspensions with combined leaf and air springs have, therefore, been under development which are less expensive and have improved riding comfort.

More specifically, air leaf suspensions each comprising a leaf spring and an air spring in combination and arranged at opposite sides of a vehicle are advantageous in that only two air springs suffice for support of the axle and in that stabilizers may be omitted because of the leaf springs serving as stabilizers, leading to simplification of the whole structure. As a result, the air leaf suspensions are less expensive and have less increase in vehicle weight than conventional four-bag air suspensions each for supporting an axle by means of four air springs arranged forwards, rearwards, left and right of the axle. Such kind of air leaf suspensions have been disclosed, for example, in the applicants' JP 2003-34113A.

Basic design concept not only in the above-mentioned air leaf suspensions but also in existing conventional suspensions resides in that periaxial rolling moments (braking and driving forces) and lateral displacement moments applied on the axle are positively suppressed to allow only vertical displacement of the axle. Improvement in vehicle-riding comfort on the basis of such design concept has, however, been limitative of itself.

Because, in order to improve vehicle-riding comfort of air leaf suspensions on the basis of such existing design concept, a leaf spring made of high-strength steel with toughness and with extremely reduced thickness is to be provided for each of the sides of a vehicle so as to attain low spring constant while air springs are to be larger-sized to give added weight in effectiveness of the air springs; however, such lowered spring constant may lead to extremely lowered spring effect so that the chassis may tend to be readily rolled, resulting in a lowering of drivability.

The present invention was made in view of the above and has its object to provide a suspension which is inexpensive and light in weight and which can attain substantial improvement in vehicle-riding comfort without lowering drivability.

BRIEF SUMMARY OF THE INVENTION

The present invention provides a suspension which comprises an axle hanged from a chassis side by resilient support means with different spring characteristics arranged forwards and rearwards of the axle, said axle being allowed to roll due to difference in spring characteristics of the forward and rearward resilient support means.

Thus, due to the difference in spring characteristics between the forward and rearward resilient support means, the axle rolls upon receipt of vibrations from a road surface. This rolling motion of the axle absorbs vibration energy transmitted from the road surface to the chassis side so that an excellent road-surface vibration shielding effect is obtained which is competitive to those of the existing expensive four-bag air suspensions.

The vibration shielding effect obtained due to the rolling motion of the axle makes it unnecessary to attain a substantially lowered spring constant which might cause an extremely lowered spring effect. Moreover, the allowed rolling motion of the axle decreases relative vertical displacement of the axle itself so that prevented are the tendency of the chassis being rolled and resultant lowering of the drivability from occurring.

In embodying the invention, the forward resilient support means may be provided by a leaf spring which is fitted at its base end to the axle and extends forwards to form a bend convex forwards in the vehicle and is mounted at its tip to a chassis side; the rearward resilient support means may be provided by an air spring interposed between a bracket fitted to the axle and extending rearwards and the chassis side above the bracket.

The this provided forward resilient support means in the form of leaf spring has the readily deflecting bend which provides a resilient support with relatively low spring constant at a position spaced forwards away from the axle while the thus provided rearward resilient support means has the air spring which provides a rearward resilient support at a position rearwardly away from the axle and having a spring constant lower than that of the bend of the forward resilient support. Due to the difference in spring characteristics between the forward and rearward resilient supports respectively provided by the leaf and air springs, the axle rolls upon receipt of vibrations from the road surface. This rolling motion of the axle absorbs the vibration energy through which vibrations from the road surface are transmitted to the chassis side so that an excellent road-surface vibration shielding is obtained which is effect and competitive as compared to those of the existing expensive four-bag air suspensions.

The spring constant of the bend of the leaf spring must be relatively low for harmony with that of the rearward air spring. However, the vibration shielding effect obtained due to the rolling motion of the axle makes it unnecessary to attain a substantially lowered spring constant which might cause an extremely lowered spring effect. Moreover, the allowed rolling motion of the axle decreases relative vertical displacement of the axle itself so that the tendency of the chassis being rolled and resultant lowering of the drivability are prevented from occurring.

In the invention, in order to allow the rolling motion of the axle, only an upper portion of the axle may be locked by suspension links so as not to be movable longitudinally of the vehicle, which allows the axle to roll about connections of the suspension links to the axle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a side view showing an embodiment of the invention.

DETAILED DESCRIPTION OF THE PREFERRED EMBODIMENT

The invention will be described in conjunction with the attached drawings.

Figure 1:
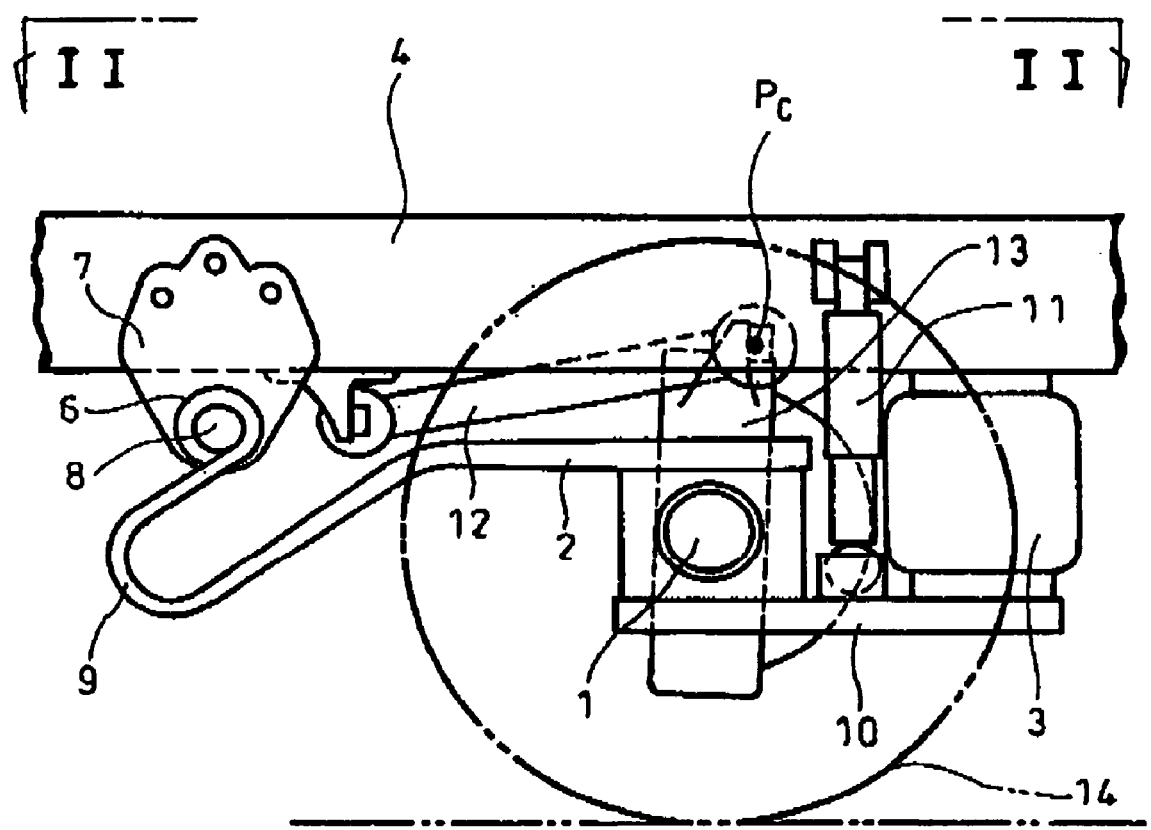
Figure 2:
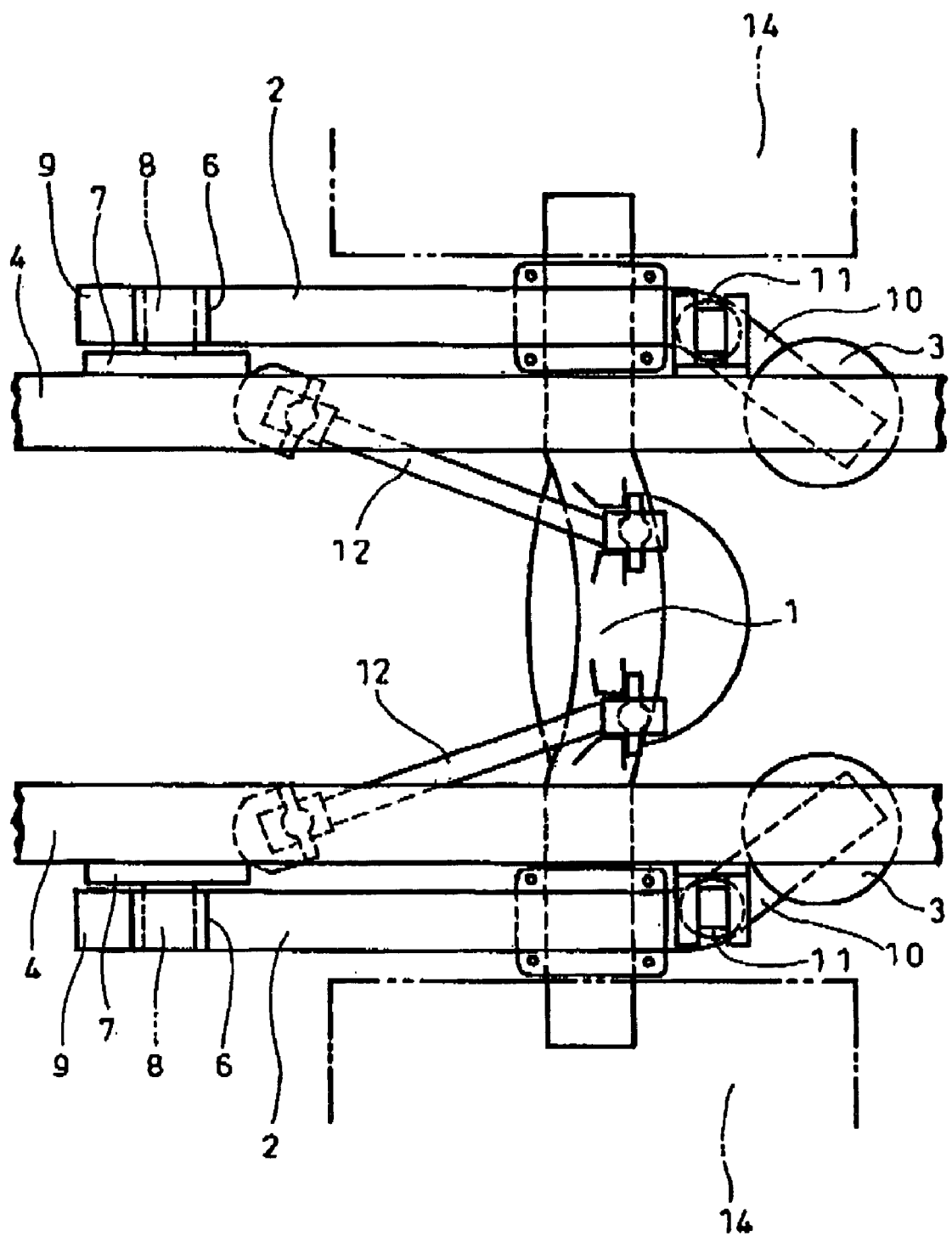
FIG. 2 is a view looking in the direction of arrows II in FIG. 1.

FIGS. 1 to 4 show an embodiment of the invention. As shown in FIGS. 1 and 2, in a suspension according to the embodiment, an axle 1 is hung from each of opposite side rails 4 by means of a leaf spring 2 forwards in the vehicle (left in FIGS. 1 and 2) and an air spring 3 rearwards in the vehicle (right in FIGS. 1 and 2). Thus, the leaf and air springs 2 and 3 provide forward and rearward resilient support means, respectively.

On both sides of the vehicle, the forward leaf spring 2 is fitted at its base end to an upper surface of an end of the axle 1 and extends forwards in the vehicle and has its tip eye 6 movably fitted over a horizontal pin 8 of a bracket 7 on an outer side surface of each of the side rails 4, the leaf spring 2 having a forward portion which provides a bend 9 protruding forwards and downwards of the eye 6 and turning rearwards and upwards in the vehicle in the form of letter J.

On both sides of the vehicle, a bracket 10 is fitted to a lower surface of the end of the axle 1 and extends rearwards in the vehicle. The bracket 10 is bent at its rearward portion laterally inwardly to be positioned just below each of the side rails 4 (see FIG. 2), an air spring 3 being interposed between this portion of the bracket 10 and the side rail 4.

The bracket 10 is connected to the side rail 4 through a shock absorber 11 which may moderate any bounce of the leaf and air springs 2 and 3 to quicken attenuation of the vibrations.

A pair of upper rods 12 (suspension links) are arranged on inner sides of the opposite side rails 4 forwards of the axle 1 and extend rearwards convergently in the vehicle to be connected via brackets 13 to a central upper surface of the axle 1. Thus, only the upper portion of the axle 1 is locked longitudinally of the vehicle so that, due to the difference in spring characteristic between the leaf and air springs 2 and 3, the axle 1 is allowed to roll about the center PC at which the upper rods 12 are connected to the axle 1 via the brackets 13.

Adoption of the illustrated upper rods 12 which extend rearwards and convergently makes it possible to cope with forces inputted both longitudinally and laterally of the vehicle. Alternatively, parallel-link type upper rods may be adopted with separate parallel lateral rods being used for force inputted laterally. In the figures, reference numeral 14 denotes tires.

With the suspension thus constructed as mentioned above, the forward resilient support means in the form of leaf spring 2 has the readily deflecting bend 9 which provides a resilient support with relatively low spring constant at a position spaced forwards away from the axle 1 while the rearward resilient support means has the air spring 3 which provides a rearward resilient support at a position backwardly separated away by the bracket 10 from the axle 1 and having spring constant lower than that of the bend 9 of the forward resilient support. Due to the difference in spring characteristic between the forward and rearward resilient supports respectively provided by the leaf and air springs 2 and 3, the axle 1 rolls about the center Pc upon receipt of vibrations from the road surface. This rolling motion of the axle 1 consume the vibration energy from the road surface as the rolling-vibration energy of the axle 1 so that an excellent road-surface vibration shielding effect is obtained which is competitive to those of the existing expensive four-bag air suspensions.

The spring constant of the bend 9 of the leaf spring 2 must be relatively low in view of harmony with that of the rearward air spring 3; however, the excellent vibration shielding effect obtained due to the rolling motion of the axle 1 makes it unnecessary to attain substantially lowered spring constant which might cause extremely lowered spring effect. Moreover, the allowed rolling motion of the axle 1 decreases relative vertical displacement of the axle itself so that the tendency of the chassis being rolled and the resultant lowering of the drivability are prevented from occurring.

Figure 3:
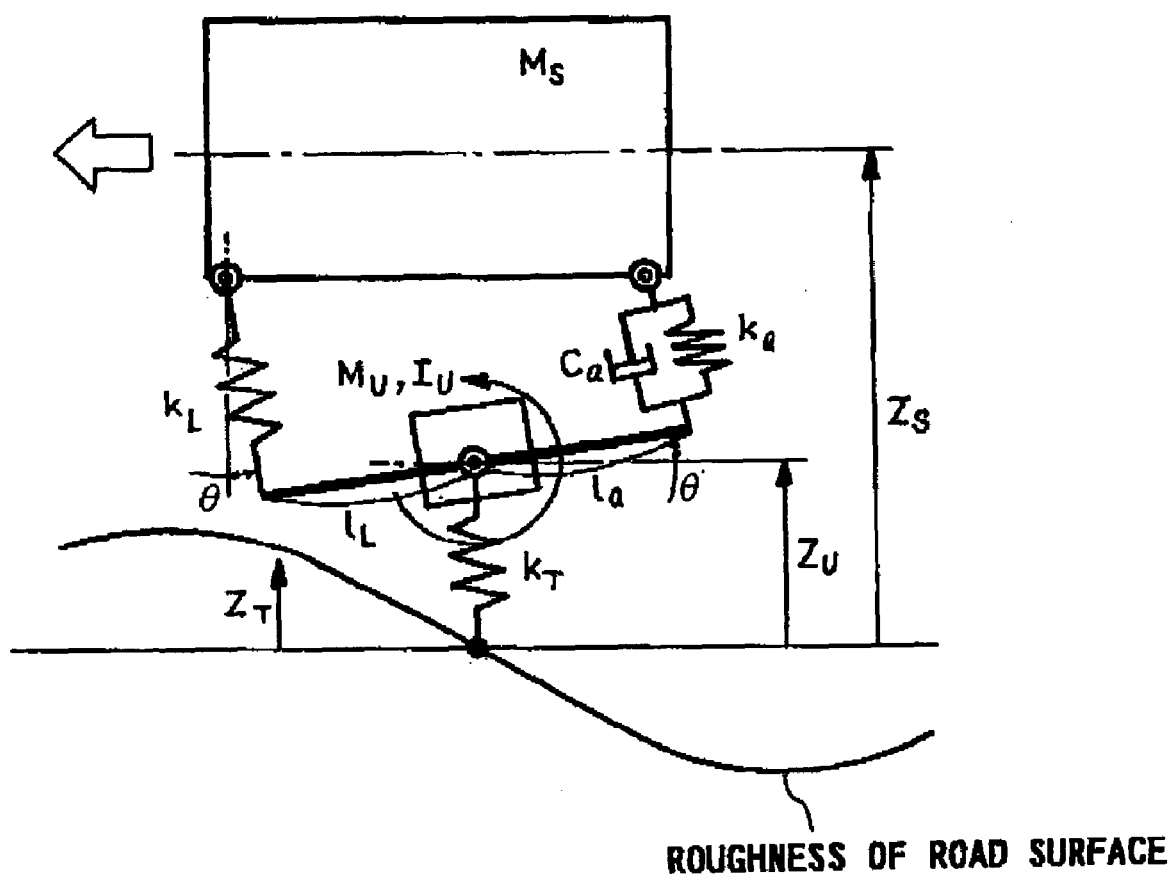
FIG. 3 shows a model from the suspension of FIG. 1.

FIG. 3 shows a model from the above-mentioned suspension shown in FIGS. 1 and 2.

$M_s$: upper mass of spring (mass of chassis side)
$M_u$: lower mass of spring (mass of suspension side)
$I_u$: rolling moment of inertia
$K_T$: spring constant of tire
$K_L$: Spring constant of leaf spring
$K_a$: spring constant of air spring
$C_a$: spring constant of shock absorber
$l_L$: distance from center of rolling motion of axle to the forward resilient support
$l_a$: distance from center of rolling motion of axle to the rearward resilient support
$Z_T$: displacement of tire side from a balanced position
$Z_s$: displacement of supper rigid body (chassis) side of spring from a balanced position
$Z_u$: displacement degree of lower rigid body (suspension) side of spring from a balanced position.

Equations of motion for arithmetic analysis of the model shown in FIG. 3 are as follows wherein (1) is an equation of vertical balance of upper rigid body (chassis) or spring; (2) is an equation of vertical balance of lower rigid body (suspension) of spring; and (3) is an equation of rolling of lower rigid body (suspension) of spring.

$$M_s\ddot{z}_s + k_L(z_S - z_U + l_L\theta) + k_a(z_S - z_U - l_a\theta) + C_a(\dot{z}_S - \dot{z}_U - l_a\dot{\theta}) = 0 \quad (1)$$

$$M_U\ddot{z}_U - k_L(z_S - z_U + l_L\theta) - k_a(z_S - z_U - l_a\theta) - C_a(\dot{z}_S - \dot{z}_U - l_a\dot{\theta}) + k_T(z_U - z_T) = 0 \quad (2)$$

$$I_U\ddot{\theta} + k_L(z_S - z_U + l_L\theta)l_L - k_a(z_S - z_U - l_a\theta)l_a - C_a(\dot{z}_S - \dot{z}_U - l_a\dot{\theta})l_a = 0 \quad (3)$$

Figure 4:
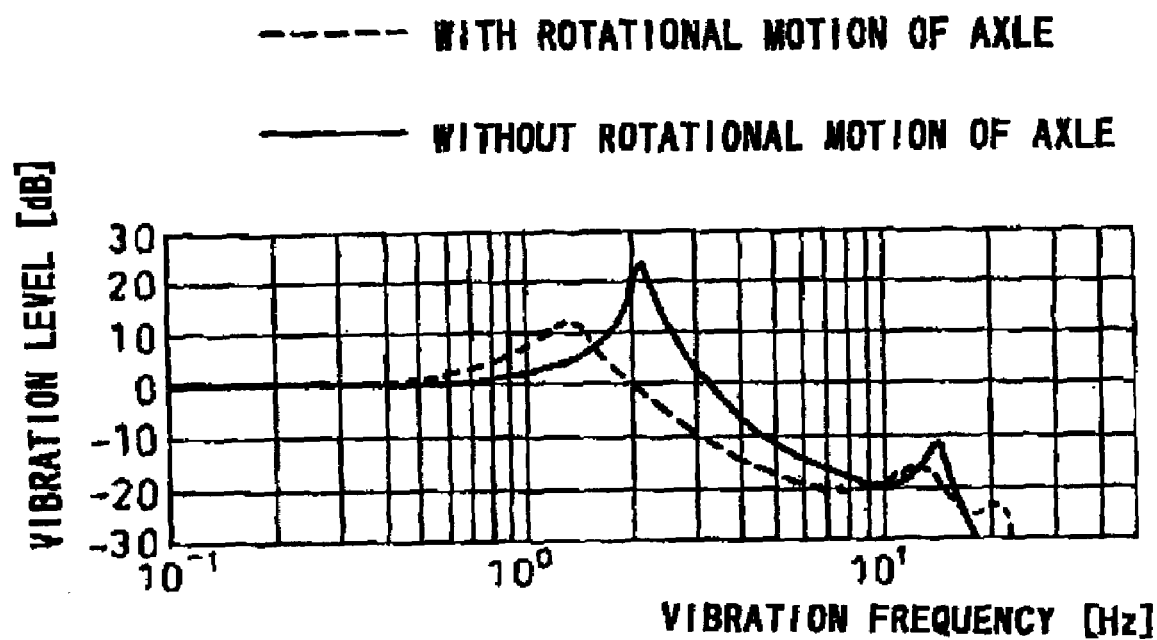
FIG. 4 is a diagram showing results of arithmetic analysis based on the model shown in FIG. 3.

These three simultaneous equations of motion are solved to obtain results as plotted in the diagram of FIG. 4. In this diagram, vibration frequency is plotted on the abcissa and vibration level is plotted on the ordinate; and curves in solid and chain lines show the cases where the axle 1 is not allowed to make rolling motion and where the axle 1 is allowed to make rolling motion, respectively.

As is clear from the diagram of FIG. 4, there are vibration peaks in the vicinities of 1 and 10 Hz in abcissa. In both of the peaks, maximum values are smaller in the case where rolling motion of the axle 1 is allowed than in the case that is not allowed, which verifies that the allowed rolling motion of the axle 1 can improve the vehicle-riding comfort.

Therefore, in the above-mentioned embodiment which adopts, without adhering to the existing design concept, a novel design concept which allows rolling motion of the axle 1, the rolling motion of the axle 1 is positively caused due to the difference in spring characteristic between the leaf and air springs 2 and 3. This rolling motion of the axle 1 consumes the vibration energy from the road surface as rolling-vibration energy of the axle 1 and can decrease vibrations transmitted to the chassis, leading to attaining an excellent vehicle-riding comfort competitive to those in the existing four-bag air suspensions without extreme lowering of spring constant and averting lowering of the drivability. Moreover the combination of the leaf and air springs 2 and 3 brings about lightness in weight and inexpensiveness in cost in comparison with the existing four-bag air suspensions.

It is to be understood that the present invention is not limited to the embodiment described above and that various changes and modifications may be made without departing from the spirit of the invention. For example, the resilient support means forwards and rearwards of the axle are not limited to the illustrated combination of the leaf and air springs.

The invention claimed is:

1. A suspension, comprising:

an axle hung from a chassis by resilient support means with different spring characteristics and arranged forwards and rearwards of the axle, said axle being allowed to undergo rolling motion due to a difference in spring characteristics of the forward and rearward resilient support means wherein said forward and rearward resilient support means are deflectable at positions respectively forwardly and rearwardly spaced from the axle, the forward resilient support means comprises a single leaf spring fitted at a base end thereof to the axle and extending forwards in the vehicle to form a J-shaped convex forward bend, said leaf spring being mounted at a tip eye thereof to a chassis side member and wherein the rearward resilient support means comprises an air spring interposed between a bracket fitted to the axle and extending rearward in the vehicle and the chassis side member above the bracket, said J-shaped convex forwards bend position between said tip eye of said leaf spring and said base end of said leaf spring.

2. The suspension according to claim 1 which comprises suspension links wherein only an upper portion of the axle is locked by said suspension links so as not to be movable longitudinally of the vehicle.

3. A suspension, comprising:

an axle hung from a chassis by resilient support mechanisms having turn spring characteristics and arranged forward and rearward of the axle, said axle being allowed to undergo rolling motion due to a difference in spring characteristics of the forward and rearward resilient support mechanisms, wherein said forward and rearward resilient support mechanisms are deflectable at positions respectively forwardly and rearwardly spaced from the axle, the forward resilient support mechanism comprises a single leaf spring fitted at a base end thereof to the axle and extending forward in the vehicle to form a J-shaped convex forward bend, said leaf spring being mounted at the tip eye thereof to a chassis side member and the rearward resilient support mechanism comprises an air spring interposed between a bracket fitted on the axle and extending rearwardly in the vehicle and the chassis side member above the bracket, said J-shaped convex forward bend positioned between said tip eye of said leaf spring and said base end of said leaf spring.

4. The suspension according to claim 3, which comprises suspension links wherein only an upper portion of the axle is locked by said suspension links so as not to be moveable longitudinally in the vehicle.

5. The suspension according to claim 3, which comprises suspension links wherein only an upper portion of the axle is locked by said suspension links so as not to be moveable longitudinally of the vehicle.

* * * * *